US011038770B2

(12) United States Patent
Raney (10) Patent No.: US 11,038,770 B2
(45) Date of Patent: Jun. 15, 2021

(54) METHODS, SYSTEMS, AND COMPUTER READABLE MEDIA FOR MANAGING DEPLOYMENT AND MAINTENANCE OF NETWORK TOOLS

(71) Applicant: Keysight Technologies, Inc., Santa Rosa, CA (US)

(72) Inventor: Kristopher Len Raney, Oak Park, CA (US)

(73) Assignee: KEYSIGHT TECHNOLOGIES, INC., Santa Rosa, CA (US)

(*) Notice: Subject to any disclaimer, the term of this patent is extended or adjusted under 35 U.S.C. 154(b) by 34 days.

(21) Appl. No.: 16/219,888

(22) Filed: Dec. 13, 2018

(65) Prior Publication Data

US 2019/0238422 A1 Aug. 1, 2019

Related U.S. Application Data

(60) Provisional application No. 62/625,321, filed on Feb. 1, 2018.

(51) Int. Cl.
*G06F 15/173* (2006.01)
*H04L 12/24* (2006.01)

(52) U.S. Cl.
CPC .......... *H04L 41/22* (2013.01); *H04L 41/0803* (2013.01); *H04L 41/20* (2013.01)

(58) Field of Classification Search
CPC ...... H04L 41/22; H04L 41/20; H04L 41/0803
USPC ................................................ 709/223, 224
See application file for complete search history.

(56) References Cited

U.S. PATENT DOCUMENTS

| | | | |
|---|---|---|---|
| 5,434,848 A | 7/1995 | Chimento, Jr. et al. | |
| 6,574,661 B1* | 6/2003 | Delano | G06F 11/0709 709/223 |
| 6,718,535 B1* | 4/2004 | Underwood | G06F 9/451 717/101 |
| 7,089,316 B2* | 8/2006 | Andersen | H04L 29/06 709/217 |

(Continued)

FOREIGN PATENT DOCUMENTS

WO WO 2018/149498 A1 8/2018

OTHER PUBLICATIONS

Non-Final Office Action for U.S. Appl. No. 15/709,433 (dated Apr. 8, 2019).

(Continued)

*Primary Examiner* — Thu Ha T Nguyen (57) ABSTRACT

A method for managing cloud deployment and maintenance of network tools includes providing a network tool user interface for displaying network tools available for deployment from different network tool providers and for receiving user selection of one or more of the network tools for deployment. A network tool provider interface allows network tool providers to submit network tools for availability via the network tool user interface. A user can select, via the network tool user interface, one or more of the network tools for cloud deployment and, a location for deploying the selected network tool. The method further includes interfacing with a service orchestration system of the location for deploying the selected network tool in the location. User interface elements are provided for monitoring performance of and maintaining deployed network tools.

20 Claims, 11 Drawing Sheets

(56) References Cited

U.S. PATENT DOCUMENTS

| | | | |
|---|---|---|---|
| 7,100,195 B1* | 8/2006 | Underwood | G06F 9/451 726/2 |
| 7,284,234 B2* | 10/2007 | Steg | H04L 41/22 717/106 |
| 7,466,710 B1* | 12/2008 | Clemm | H04L 41/0873 370/401 |
| 7,526,681 B2 | 4/2009 | Anafi et al. | |
| 7,899,846 B2 | 3/2011 | Flynn et al. | |
| 8,316,438 B1* | 11/2012 | Bush | H04L 12/66 726/22 |
| 8,458,111 B2 | 6/2013 | Wolf et al. | |
| 8,612,599 B2 | 12/2013 | Tung et al. | |
| 8,656,006 B2 | 2/2014 | Cobb et al. | |
| 8,869,107 B2 | 10/2014 | Taylor et al. | |
| 9,037,710 B2 | 5/2015 | Gerber et al. | |
| 9,043,747 B2 | 5/2015 | Eksten et al. | |
| 9,047,414 B1 | 6/2015 | Matyjek | |
| 9,077,760 B2* | 7/2015 | McKeown | H04L 29/06 |
| 9,110,703 B2 | 8/2015 | Santos et al. | |
| 9,154,327 B1 | 10/2015 | Marino et al. | |
| 9,276,812 B1 | 3/2016 | Nagargadde et al. | |
| 9,471,463 B1 | 10/2016 | Bates et al. | |
| 9,575,732 B2 | 2/2017 | Welicki et al. | |
| 9,680,728 B2 | 6/2017 | Besser | |
| 9,760,928 B1* | 9/2017 | Ward, Jr. | G06Q 30/0619 |
| 9,818,127 B2* | 11/2017 | Iyoob | G06Q 30/0206 |
| 9,838,272 B2 | 12/2017 | Djukic et al. | |
| 9,875,087 B2 | 1/2018 | Scholz et al. | |
| 10,178,003 B2 | 1/2019 | Raney et al. | |
| 10,338,958 B1* | 7/2019 | Kamboj | G06F 16/254 |
| 10,534,701 B1 | 1/2020 | Pande et al. | |
| 10,541,901 B2 | 1/2020 | Raney | |
| 10,733,088 B1* | 8/2020 | Sommers | G06F 11/3684 |
| 10,764,169 B2 | 9/2020 | Mircescu | |
| 10,812,349 B2 | 10/2020 | Raney et al. | |
| 10,951,509 B1 | 3/2021 | Liu et al. | |
| 2001/0052013 A1* | 12/2001 | Munguia | G06F 11/0709 709/225 |
| 2002/0174180 A1* | 11/2002 | Brown | G06F 16/1787 709/203 |
| 2004/0117802 A1* | 6/2004 | Green | G06F 11/3072 719/318 |
| 2006/0028999 A1 | 2/2006 | Iakobashvili et al. | |
| 2006/0075093 A1 | 4/2006 | Frattura et al. | |
| 2007/0234293 A1 | 10/2007 | Noller et al. | |
| 2008/0201468 A1* | 8/2008 | Titus | H04L 43/0829 709/224 |
| 2009/0112683 A1* | 4/2009 | Hamilton, II | G06Q 30/02 705/7.32 |
| 2010/0115606 A1* | 5/2010 | Samovskiy | H04L 41/20 726/15 |
| 2010/0318974 A1* | 12/2010 | Hrastnik | G06F 11/3696 717/135 |
| 2011/0004698 A1 | 1/2011 | Wu | |
| 2011/0231552 A1 | 9/2011 | Carter et al. | |
| 2011/0235991 A1* | 9/2011 | Luthra | H04N 21/4126 386/232 |
| 2011/0307889 A1 | 12/2011 | Moriki et al. | |
| 2012/0079480 A1 | 3/2012 | Liu | |
| 2012/0089727 A1* | 4/2012 | Raleigh | H04L 12/14 709/224 |
| 2012/0185913 A1 | 7/2012 | Martinez et al. | |
| 2012/0191545 A1* | 7/2012 | Leibu | G06F 16/907 705/14.66 |
| 2012/0210318 A1 | 8/2012 | Sanghvi et al. | |
| 2013/0031233 A1 | 1/2013 | Feng et al. | |
| 2013/0262931 A1* | 10/2013 | Siddalingesh | G06F 11/3672 714/28 |
| 2013/0291109 A1 | 10/2013 | Staniford et al. | |
| 2013/0305357 A1 | 11/2013 | Ayyagari et al. | |
| 2014/0006597 A1 | 1/2014 | Ganguli et al. | |
| 2014/0026122 A1 | 1/2014 | Markande et al. | |
| 2014/0047272 A1 | 2/2014 | Breternitz et al. | |
| 2014/0047342 A1* | 2/2014 | Breternitz | G06F 9/5061 715/735 |
| 2014/0180664 A1 | 6/2014 | Kochunni et al. | |
| 2014/0215443 A1 | 7/2014 | Voccio et al. | |
| 2014/0215450 A1* | 7/2014 | Salisbury | G06F 8/60 717/170 |
| 2014/0229605 A1 | 8/2014 | Besser | |
| 2014/0278623 A1 | 9/2014 | Martinez et al. | |
| 2014/0278808 A1 | 9/2014 | Iyoob et al. | |
| 2015/0052499 A1* | 2/2015 | Finch | G06F 11/3688 717/124 |
| 2015/0263889 A1 | 9/2015 | Newton | |
| 2015/0319030 A1 | 11/2015 | Nachum | |
| 2015/0324182 A1* | 11/2015 | Barros | G06F 8/61 717/174 |
| 2015/0339107 A1* | 11/2015 | Krishnamurthy | G06F 8/20 717/107 |
| 2016/0094418 A1 | 3/2016 | Raney | |
| 2016/0094668 A1 | 3/2016 | Chang et al. | |
| 2016/0110211 A1 | 4/2016 | Karnes | |
| 2016/0269482 A1 | 9/2016 | Jamjoom et al. | |
| 2016/0359888 A1 | 12/2016 | Gupta et al. | |
| 2016/0364307 A1 | 12/2016 | Garg et al. | |
| 2017/0006135 A1 | 1/2017 | Siebel et al. | |
| 2017/0090463 A1* | 3/2017 | Wang | G05B 19/418 |
| 2017/0099195 A1 | 4/2017 | Raney | |
| 2017/0118102 A1 | 4/2017 | Majumder et al. | |
| 2017/0163510 A1 | 6/2017 | Arora et al. | |
| 2017/0171033 A1* | 6/2017 | Lucas | H04L 41/145 |
| 2017/0171034 A1* | 6/2017 | Lucas | G06F 3/0482 |
| 2017/0180318 A1* | 6/2017 | Lutas | H04L 63/0245 |
| 2017/0180567 A1* | 6/2017 | Sharma | H04M 15/00 |
| 2017/0353351 A1 | 12/2017 | Cheng et al. | |
| 2018/0041477 A1 | 2/2018 | Shaposhnik | |
| 2018/0096105 A1* | 4/2018 | Bleicher | G06Q 50/22 |
| 2018/0152884 A1 | 5/2018 | Hu et al. | |
| 2018/0176106 A1 | 6/2018 | Raney et al. | |
| 2018/0206100 A1* | 7/2018 | Eisner | H04W 64/00 |
| 2019/0007453 A1 | 1/2019 | Nimmagadda et al. | |
| 2019/0034957 A1* | 1/2019 | Koryakin | G06Q 30/0225 |
| 2019/0044583 A1 | 2/2019 | Garcia | |
| 2019/0045008 A1 | 2/2019 | Murthy et al. | |
| 2019/0052549 A1 | 2/2019 | Duggal et al. | |
| 2019/0089617 A1 | 3/2019 | Raney | |
| 2019/0109777 A1 | 4/2019 | Mircescu | |
| 2019/0213326 A1 | 7/2019 | Dykes | |
| 2019/0260651 A1* | 8/2019 | Raney | H04L 43/12 |

OTHER PUBLICATIONS

Notice of Allowance and Fee(s) Due for U.S. Appl. No. 15/709,433 (dated Oct. 18, 2019).

Commonly-assigned, co-pending U.S. Appl. No. 16/653,961 for "Methods, Systems and Computer Readable Media for Providing a Declarative Network Monitoring Environment," (Unpublished, filed Oct. 15, 2019).

Non-Final Office Action for U.S. Appl. No. 15/729,061 (dated Oct. 10, 2019).

Commonly-assigned, co-pending U.S. Appl. No. 16/434,825 for "Methods, Systems, and Computer Readable Media for Providing Intent-Driven Microapps for Execution on Communications Network Testing Devices," (Unpublished, filed Jun. 7, 2019).

Notice of Allowance and Fee(s) Due for U.S. Appl. No. 15/709,433 (dated Aug. 23, 2019).

"Managed Detection and Response," esentire, Gartner Press Release, pp. 1-11 (dated Mar. 14, 2017).

Commonly-assigned, co-pending U.S. Appl. No. 16/251,019 for "Methods, Systems and Computer Readable Media for Triggering On-Demand Dynamic Activation of Cloud-Based Network Visibility Tools," (Unpublished, filed Jan. 17, 2019).

Notice of Allowance and Fee(s) Due for U.S. Appl. No. 15/379,966 (dated Sep. 5, 2018).

Ex Parte Quayle Action for U.S. Appl. No. 15/379,966 (dated Jun. 13, 2018).

International Search Report and Written Opinion for International Patent Application Serial No. PCT/US2017/063909 (dated Mar. 1, 2018).

(56) References Cited

OTHER PUBLICATIONS

Commonly-assigned, co-pending U.S. Appl. No. 15/729,061 for "Methods, Systems, and Computer Readable Media for Testing Virtual Network Components Deployed in Virtual Private Clouds (VPCs)," (Unpublished, filed Oct. 10, 2017).

Commonly-assigned, co-pending U.S. Appl. No. 15/709,433 for "Methods Systems and Computer Readable Media for Optimizing Placement of Virtual Network Visibility Components" (Unpublished, filed Sep. 19, 2017).

"Kubernetes," Wikipedia, the free encyclopedia, https://en.wikipedia.org/wiki/Kubernetes, pp. 1-6 (Sep. 14, 2017).

"Ixia Cloudlens Private," Ixia, Data Sheet, 915-3736-01-6071 Rev A, pp. 1-15 (Aug. 21, 2017).

"IXNETWORK® Virtual Edition (VE) Virtualized Network Performance Testing," Ixia, A Keysight Business, Data Sheet, 915-2901-01-7061 Rev A, www.ixiacom.com, pp. 1-14 (Aug. 2017).

"The ABCs of Network Visibility," Ixia, pp. 1-57 (Jul. 5, 2017).

"Amazon Virtual Private Cloud VPC Peering Guide," Amazon Web Services, Inc., pp. 1-61 (2017).

"Ixia Flex TapTM," Ixia, Document No. 915-6813-01 Rev B, pp. 1-5 (Oct. 2015).

"Ixia Phantom vTapTM with TapFlowTM Filtering," Ixia, Document No. 915-6805-01 Rev K, pp. 1-4 (Jul. 2015).

"Ixia xFilterTM," Ixia, Document No. 915-6804-01 Rev E, pp. 1-5 (May 2015).

Hofstede et al., "Flow Monitoring Explained: From Packet Capture to Data Analysis with NetFlow and IPFIX," IEEE Communications Surveys & Tutorials, vol. 16, Issue 4, pp. 2037-2064 (May 12, 2014).

Advisory Action for U.S. Appl. No. 15/729,061 (dated Apr. 15, 2020).

Final Office Action for U.S. Appl. No. 15/729,061 (dated Feb. 6, 2020).

Notice of Allowance and Fee(s) Due for U.S. Appl. No. 15/729,061 (dated Jun. 12, 2020).

Non-Final Office Action for U.S. Appl. No. 16/434,825 (dated Jun. 5, 2020).

Notice of Allowance and Fee(s) Due and Examiner-Initiated Interview Summary for U.S. Appl. No. 16/251,019 (dated May 27, 2020).

Notice of Allowance and Fee(s) Due for U.S. Appl. No. 16/434,825 (dated Dec. 18, 2020).

* cited by examiner

METHODS, SYSTEMS, AND COMPUTER READABLE MEDIA FOR MANAGING DEPLOYMENT AND MAINTENANCE OF NETWORK TOOLS

PRIORITY CLAIM

This application claims the priority benefit of U.S. Provisional Patent Application Ser. No. 62/625,321 filed Feb. 1, 2018, the disclosure of which is incorporated herein by reference in its entirety.

TECHNICAL FIELD

The subject matter described herein relates to deploying network tools in cloud and on-premises networks. More particularly, the subject matter described herein relates to methods, systems, and computer readable media for managing deployment and maintenance of network tools.

BACKGROUND

Network visibility tools are tools that monitor packets that traverse the network. Such tools can be deployed in cloud networks to monitor packets and application performance in cloud networks. One current deployment model for visibility tools in cloud network is for an end user to purchase a visibility tool, deploy the visibility tool in the user's cloud network, and operate and maintain the tool using only interfaces provided by the tool itself. Such self-deployment and maintenance using visibility-tool-specific user interfaces is labor intensive and could result in deployment, maintenance, or operation errors.

In addition, visibility tools available from different network visibility tool providers will have different user interfaces. A user seeking to deploy and manage visibility tools from different visibility tool providers must be trained in the user interfaces of each individual network visibility tool. Requiring users to use the individual user interfaces of each visibility tool may lead to inconsistent operation and maintenance when visibility tools from different providers are deployed.

Network test tools are tools that are used to test the performance and functionality of network devices. Some network test tools test network devices by transmitting packets to the network devices and monitoring the performance of the network devices based on the response of the devices to the received packets. Like network visibility tools, network test tools are available from different network test tool providers with different user interfaces, making manual deployment and maintenance of large numbers of such tools from the same or different providers labor-intensive.

Accordingly, there exists a need for methods, systems, and computer readable media for managing deployment and maintenance of network tools.

SUMMARY

Methods, systems, and computer readable media for managing deployment and maintenance of network tools are provided. One method includes providing a cloud network tool user interface for displaying network tools available for cloud deployment from a plurality of different network tool providers and for receiving user selection of one or more of the network tools for cloud deployment. The method further includes providing a network tool provider interface for allowing network tool providers to submit network tools for availability via the network tool user interface. The method further includes receiving, from a user and via the network tool user interface, selection of one or more of the network tools for cloud deployment. The method further includes receiving, via the network tool user interface, a location for deploying the selected network tool. The method further includes interfacing with a service orchestration system of the location for deploying the selected network tool in the location. The method further includes providing at least one user interface element for monitoring performance of deployed network tools. The method further includes providing at least one user interface element for maintaining the network tool.

A system for managing cloud deployment and maintenance of network tools includes at least one processor. The system further includes a network tool user interface implemented by the at least one processor for displaying network tools available for cloud deployment from a plurality of different network tool providers and for receiving user selection of one or more of the network tools for cloud deployment. The system further includes a network tool provider interface implemented by the at least one processor for network tool providers to submit network tools to be made available to users via the network tool user interface. The network tool user interface is configured to receive, from a user, selection of one or more of the network tools for cloud deployment and a location for deploying the selected network tool. The system further includes a network tool maintenance manager for interfacing with a service orchestration system of the location for deploying the selected network tool in the location. The network tool user interface provides at least one user interface element for managing operation of the network tool.

The subject matter described herein may be implemented in hardware, software, firmware, or any combination thereof. As such, the terms "function", "node", or "module" as used herein refer to hardware, which may also include software and/or firmware components, for implementing the feature being described. In one example implementation, the subject matter described herein may be implemented using a non-transitory computer readable medium having stored thereon computer executable instructions that when executed by the processor of a computer control the computer to perform steps. Example computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

DETAILED DESCRIPTION

Figure 1:
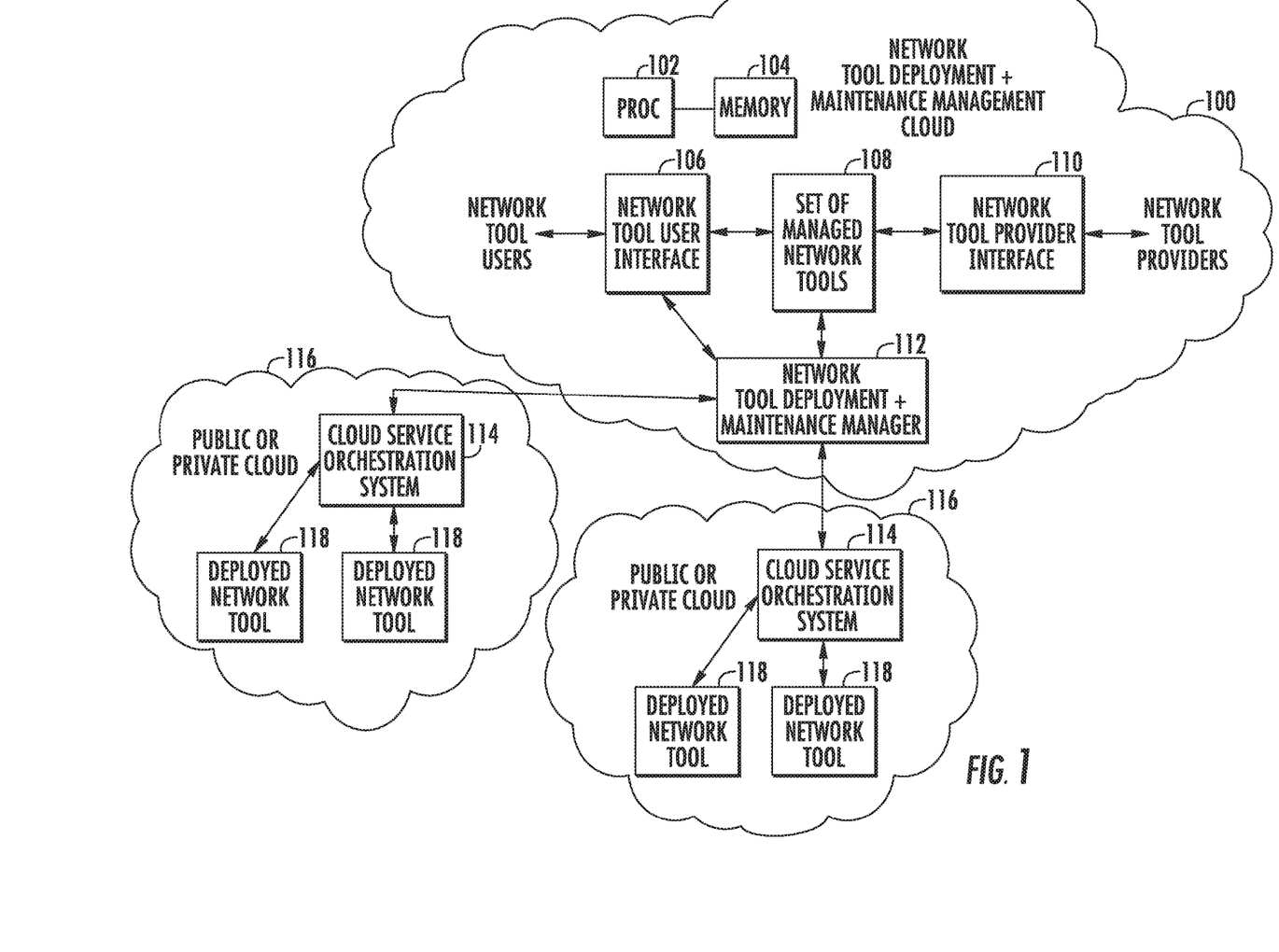
FIG. 1 is a network diagram of the system for managing cloud deployment and maintenance of network tools.

FIG. 1 is a network diagram of a system for managing cloud deployment and maintenance of network tools. Referring to FIG. 1, the system includes a network tool deployment and maintenance management cloud 100. Cloud 100 may include one or more processors 102 and memory 104 on which the components in network tool deployment and maintenance management cloud 100 execute. In the illustrated example, the deployment and maintenance components executing in cloud 100 include a cloud network tool user interface 106, which allows users to access a set of managed network tools 108 from plural different network tool providers. Examples of network tools that may be provided include virtual intrusion detection systems, application performance analyzers, and call quality analyzers from different vendors. Virtual network tools are instances of these entities that are optimized for cloud deployment. The network tools are said to be "managed" because the network tools may undergo a validation process before the tools are permitted to be made available to users via user interface 106.

Cloud 100 also includes a network tool provider interface 110 for allowing network tool providers to submit new network tools to be made available to users via network tool user interface 106. Provider interface 110 may also allow providers to submit updates to deployed tools. A network tool deployment and maintenance manager 112 interfaces with cloud service provider orchestration systems 114 of different clouds 116 to deploy network tools 118 in locations selected by users via network tool user interface 106.

Figure 2A:
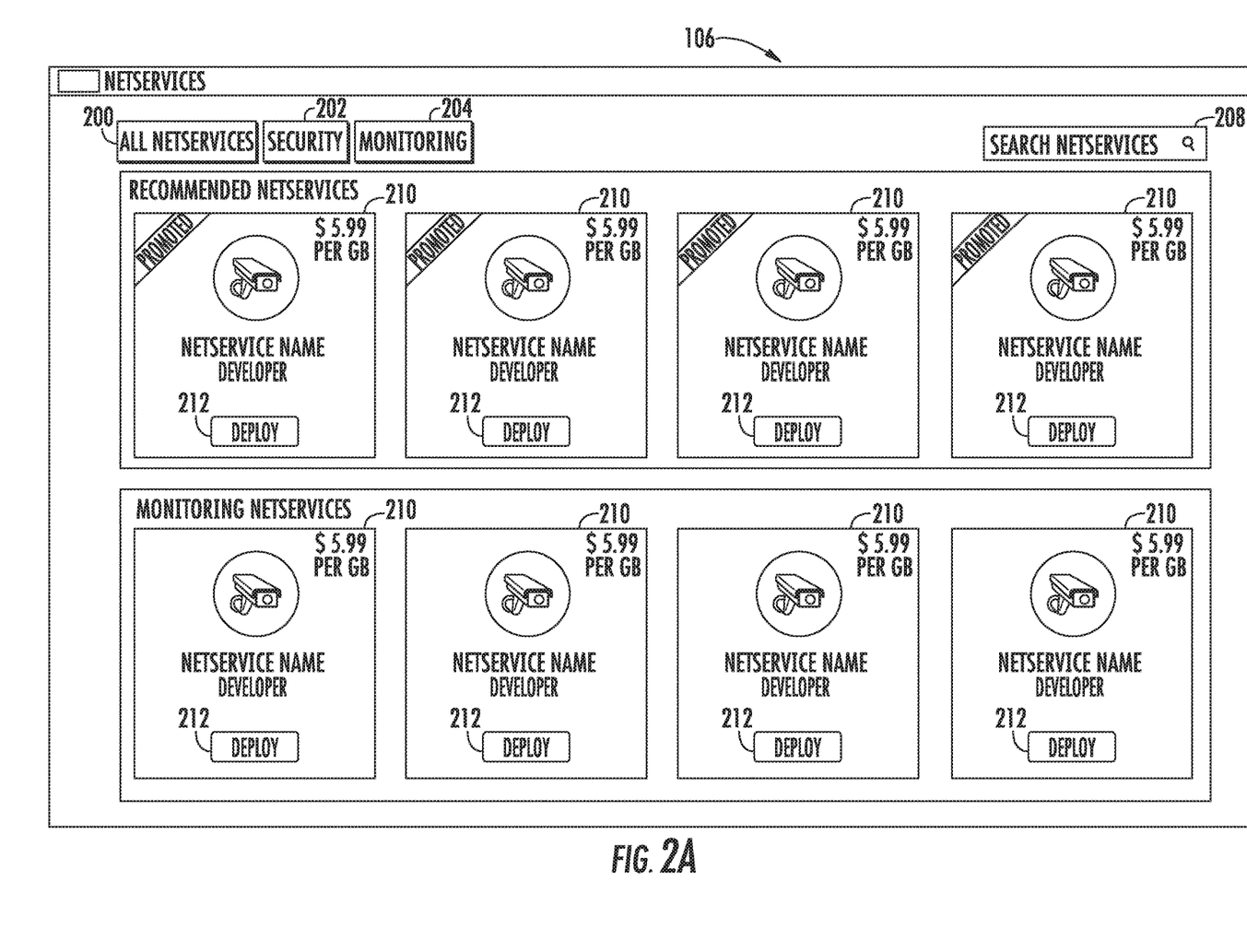
FIGS. 2A-2E are examples of user interface elements may be provided by a network tool user interface for cloud deployment and management of network tools.

In one example, cloud network tool user interface 106 may provide an app store like environment that allows a user to search for and select network tools of interest. FIG. 2A is an example of a marketplace screen that may be provided by network tool user interface 106. In FIG. 2A, the marketplace screen includes selectable categories 200, 202, and 204 for different cloud-based services. The marketplace screen also includes a search dialog box 208 for allowing the user to search for network tools using search criteria. User interface 106 displays icons 210 for network tools that provide different services, such as different network test or visibility services. Each icon also includes a deploy button 212 for allowing the user to initiate deployment of the corresponding network visibility service.

Figure 2B:
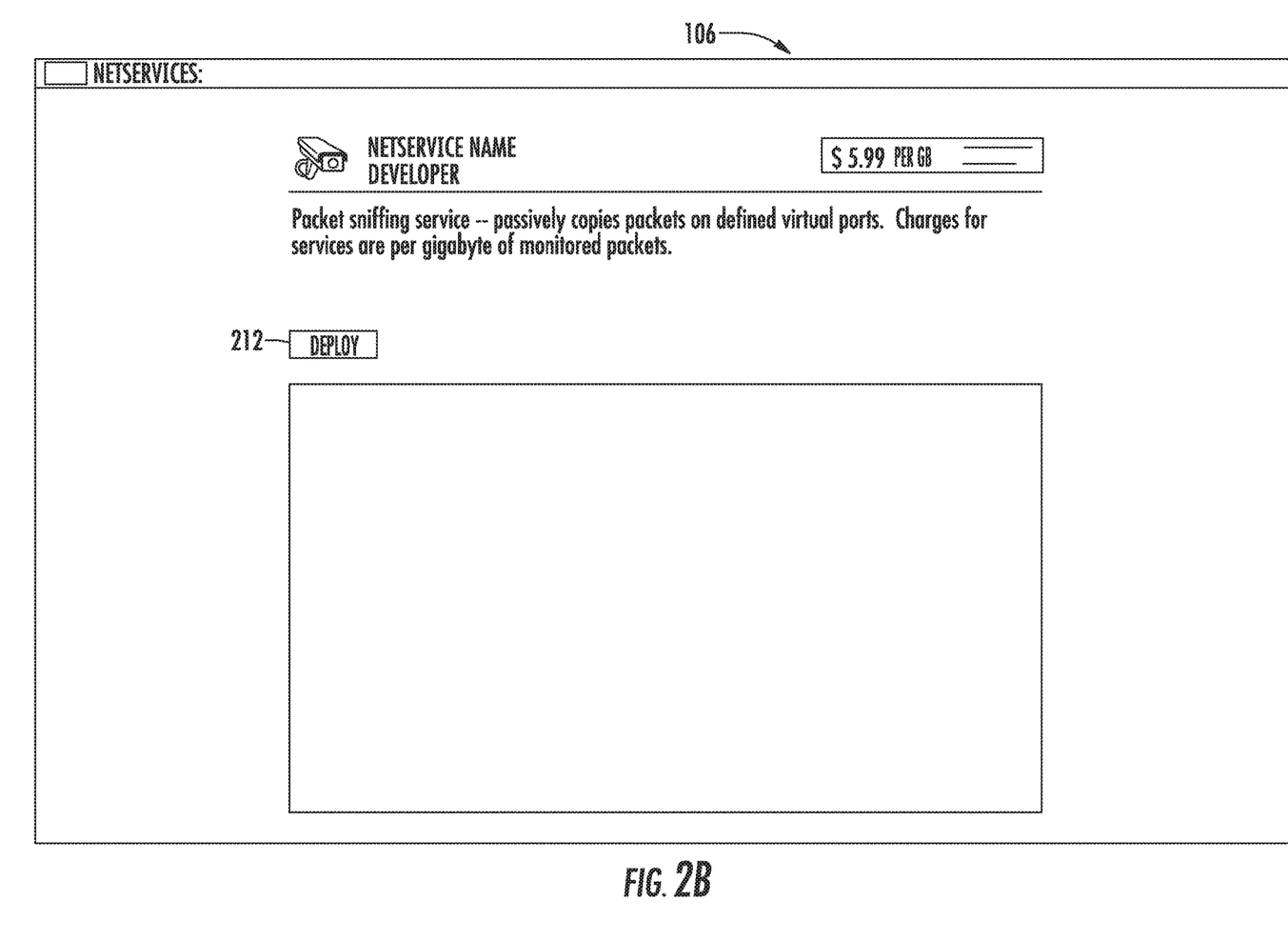

When the user clicks on one of icons 210, the user is taken to the service detail screen illustrated in FIG. 2B. In FIG. 2B, the service detail screen includes additional information about the selected visibility service as well as a deploy button 212. In FIG. 2B, the additional information that is displayed includes text that describes the operation and charging details of a packet sniffing service.

If user selects deploy button 212 either from the marketplace screen in FIG. 2A or the detail panel in FIG. 2B, the user is taken through a sign-up process. The sign up process will establish authentication credentials and collect necessary information and to establish billing for the service. Once the user goes through this process, the user will become authenticated.

Figure 2C:
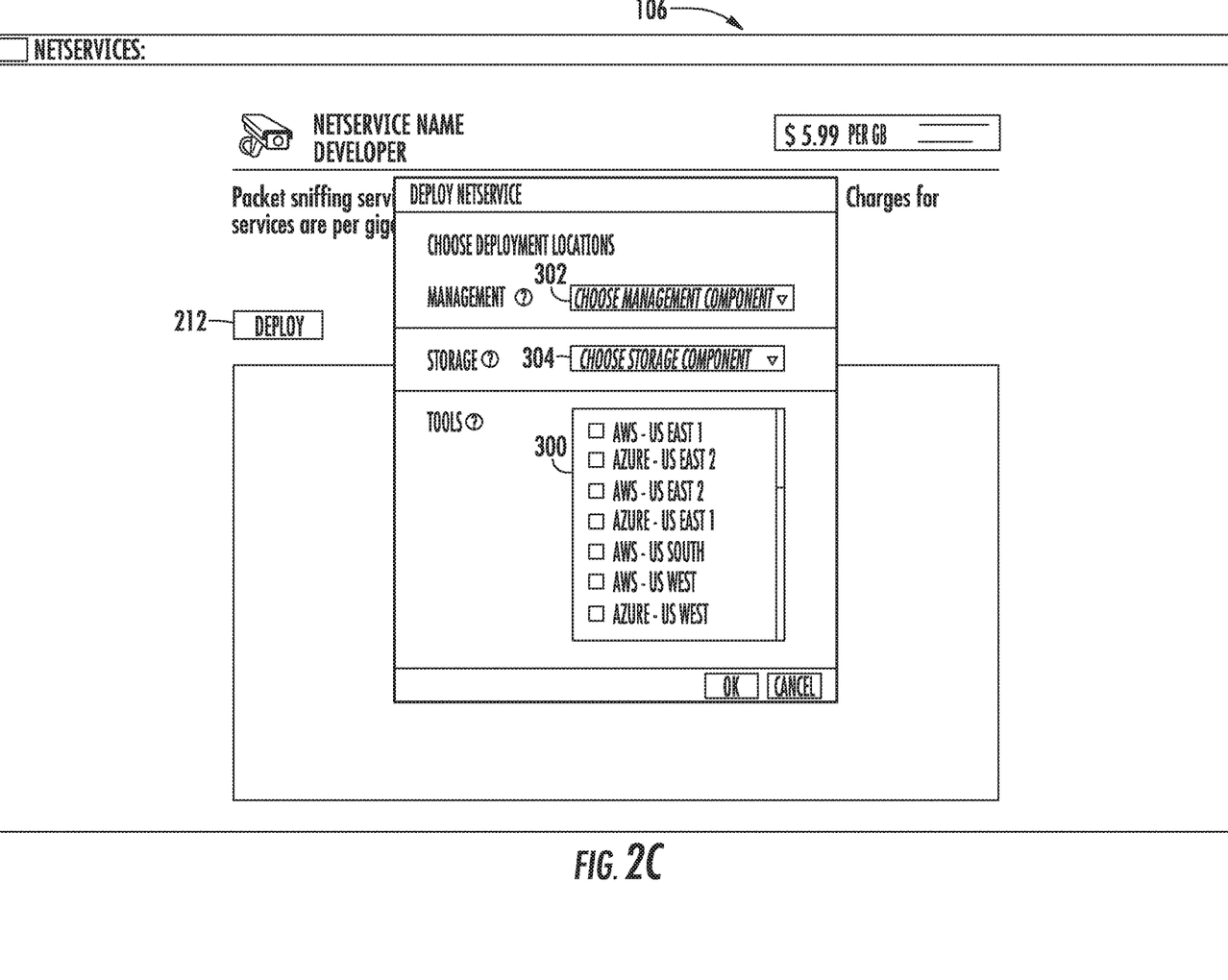

FIG. 2C illustrates an example of a deployment panel for user-managed deployment of network tools that may be displayed by network tool user interface 106 when the user selects a deploy button 212 (from either the screen illustrated in FIG. 2A or 2B) and completes the sign-up process. The deployment panel in FIG. 2C provides for user selection of cloud deployment locations of network tools. In the illustrated example, a location dialog box 300 includes one or more cloud deployment locations, which in the illustrated example are zones for hosting a tool or component. The zones may be preselected zones defined by the manager of management cloud 100 or zones that are defined by the user. A given tool can be deployed in more than one zone.

The deployment panel in FIG. 2C also provides for user selection of management locations for deployed network tools. In the illustrated example, the user also selects a location for managing deployed tools via dialog box 302 and location for storing data collected by the tools via dialog box 304. The locations for management and storage for a network tool may be cloud locations that are in the same cloud location or zone as the network tool being deployed or in separate cloud locations or zones from the network tool being deployed. Once the user selects ok via the deployment screen, network tool deployment and maintenance manager 112 deploys the tools in the indicated zones and sets up management of storage and management locations for the network tool. The management location for a deployment of network tools may be the cloud location where the management components of cloud 100 illustrated in FIG. 1. For example, the user may select a cloud network where network tool deployment and maintenance manager 112 and the components of user interface associated with ongoing maintenance of deployed network services will execute.

In the example illustrated in FIG. 2C, the deployment zones for network tools include cloud availability zones in the Amazon Web Services (AWS) cloud and the Microsoft Azure cloud. The subject matter described herein is not limited to deployment in AWS or Azure clouds. The availability zones that may be displayed by network tool user interface 106 as possible deployment locations can be any cloud network to which network tool user interface 106 and network tool deployment and maintenance manager 112 have access.

Figure 2D:
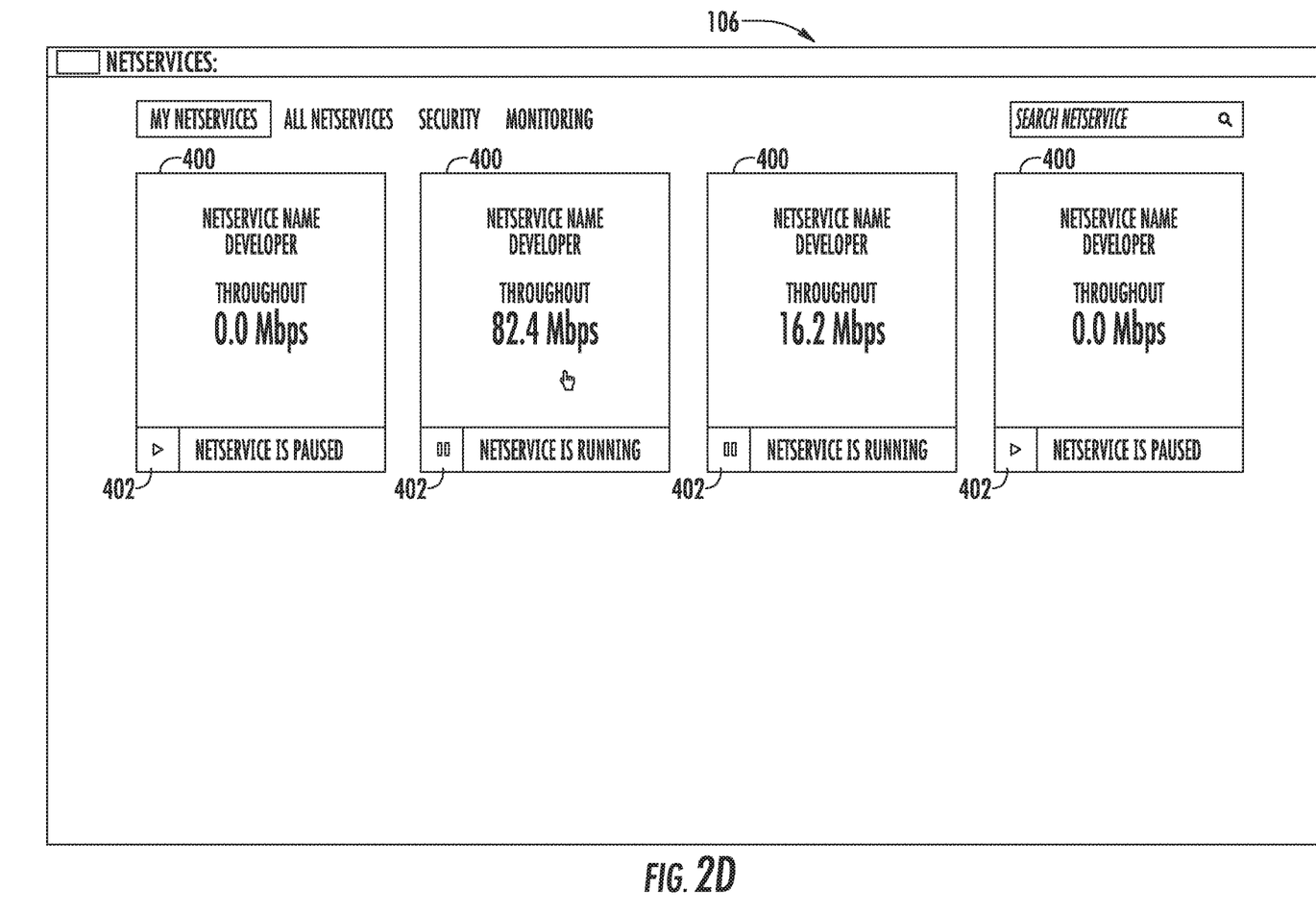

Network tool user interface 106 provides functionality for the user to manage deployed network tools, including starting tools, stopping tools, monitoring performance of deployed network tools, adding tools, and deleting tools. FIG. 2D illustrates an example of a service monitoring screen that may be provided by user interface 106 and which displays operating statistics of deployed network tools and allows a user to monitor performance of deployed network tools. In the illustrated example, the service monitoring screen includes icons 400 corresponding to deployed network tools, where each icon displays throughput associated with each service or deployed tool. Each icon 400 also indicates whether the service is running or paused and allows the user to change the status between running and paused. For example, each icon 400 may include a play/pause button 402 that allows the user to toggle the corresponding network tool between a running and paused state. The throughput metric associated with each deployed network tool may be useful for the user to determine whether a network tool is overloaded or not and whether or not to deploy additional network tools.

It should be noted that the service monitoring screen illustrated in FIG. 2D allows the user to easily monitor performance of network tools from different network tool providers. For example, each icon 400 may display operating statistics for a network tool available from a different network tool provider. Providing a single user interface or screen that allows the user to view operating statistics from different network tool providers is believed to be advantageous over approaches where network tools are monitored individually using user interface software provided by each different network tool provider.

Figure 2E:
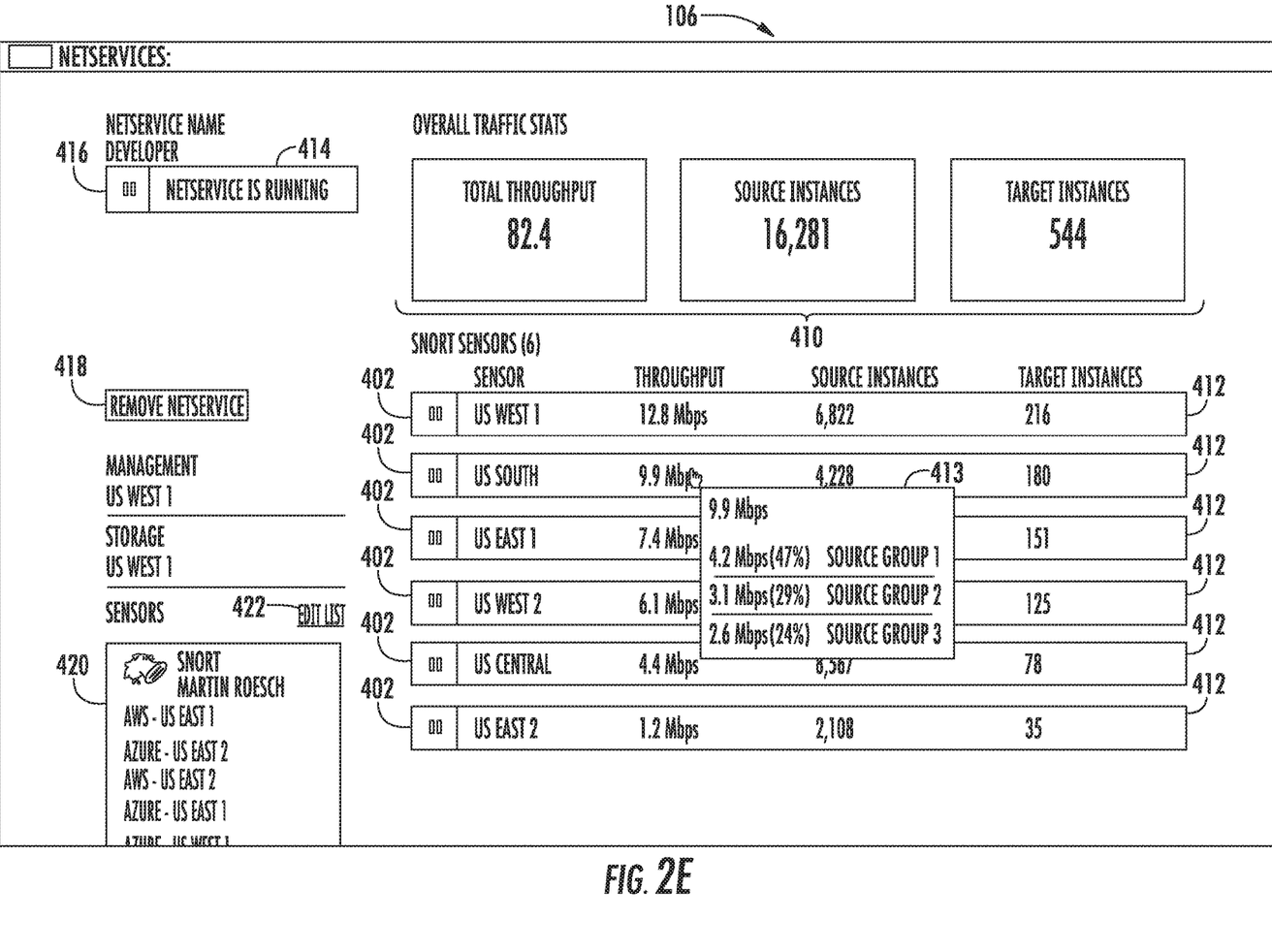

FIG. 2E illustrates an example of network tool maintenance functionality that is provided by network tool user interface 106. In FIG. 2E, a service maintenance screen is displayed. The service maintenance screen includes a total or overall traffic statistics section 410 that displays traffic statistics including throughput, total source instances, and target instances of all network tools being maintained through cloud network tool user interface 106 for a particular user or service. The service maintenance screen further includes individual statistics bars 412 that display the name of each network tool and individual traffic statistics for each tool, including throughput, source instances, and target instances. When the user clicks on one of the throughput values, the service maintenance panel displays a pop-up box 413 that displays throughput contributions of each source group for a particular network tool. Play/pause buttons 402 also included to allow the user to toggle between playing (starting) and pausing of a particular network tool provided service.

It should be noted that the service maintenance screen illustrated in FIG. 2E may display operating statistics for network tools available from different providers and allow the user to manage the network tools from different providers. For example, statistics bars 412 may display operating statistics for network tools from different providers and allow the network tools from the different providers to be individually paused and restarted. Providing a single user interface where network tools from different providers can be managed is believed to be one advantage of the subject matter described herein over individual network tool deployments without a management interface that allows consistent management of network tools from different tool providers.

In the illustrated example, the network tool provided service is a visibility service that consists of six different visibility tools. It may be desirable to manage the service as a whole. Accordingly, the service maintenance screen provides overall service status indicator 414, which in the illustrated example indicates whether the service is running or not, and a global play/pause button 416 which allows the user to start and stop the monitoring by all of the visibility tools that provide the service with a single user interface action. The service maintenance screen also displays a remove service button 418. When the user selects the move service button 418, all of the visibility tools that are installed and providing the service are halted and removed from their respective networks.

The service maintenance screen further includes a list 420 of cloud locations where network tools are deployed. An edit link 422 is also provided, which allows the user to edit list 420.

User interface 106 may also allow a user to link into a service specific UI, such as a user interface (UI) specific to a network tool. The UIs for specific network tools may be separate from the components described herein deploying and managing the tools. In one implementation, the user may seamlessly switch between the network tool management interfaces illustrated in FIGS. 2C-2E and tool specific UIs using a menu bar or other graphical construct. For example, in FIG. 2E, each statistics bar 412 may be provided with a button labeled "tool-specific UI" that allows the user to switch to displaying a tool specific UI. A similar button may be added to or displayed concurrently with the tool-specific UI for allowing the user to switch back to the management UI illustrated in FIGS. 2A-2E.

In the examples in FIGS. 2A-2E, user interface 106 is a graphical interface for managing deployment and maintenance of network tools. User interface 106 may also include an application programming interface (API) or an event triggered interface through which a user can define conditions for automated deployment and maintenance of the network tools. For example, using an API, a network tool user, such as a business with multiple locations, can define conditions for automated updates to deployed network tools. When an update becomes available, a script written by the user via the API may automatically update the tools in locations selected by the user. User interface 106 may also allow the user to define events which trigger automated updates to deployed network tools using a Git or other data repository. A user may write conditions to trigger an update to deployed tools in the Git repository, and the operator of network tool deployment and maintenance cloud may read the conditions specified by the user, determine when an event corresponding to one of the conditions occurs, and, in response, update deployed network tools.

Figure 3:
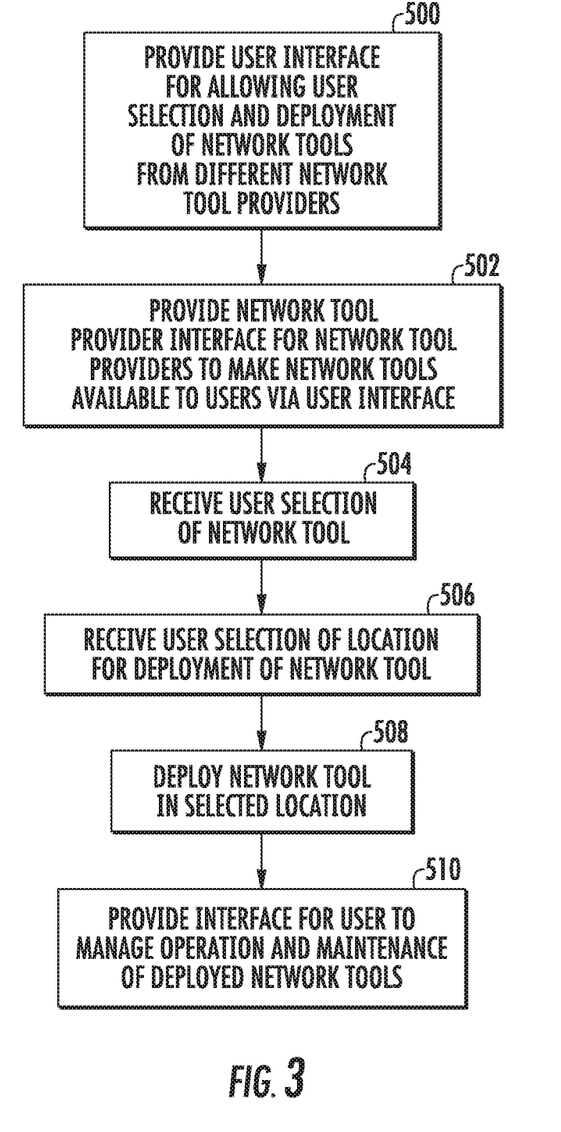
FIG. 3 is a flow chart illustrating an exemplary process for managing cloud deployment and maintenance of network tools.

FIG. 3 is a flow chart illustrating an exemplary process for managing cloud deployment and maintenance of network tools. Referring to FIG. 3, in step 500, the method includes providing a user interface for allowing user selection and deployment of network tools from a plurality of different network tool providers. For example, user interface 106 may provide an application store like environment, for example, as illustrated in FIG. 2A where icons 210 for different cloud visibility services are displayed and are selectable by the user for cloud deployment.

In step 502, the method includes providing a network tool provider interface for network tool providers to make network tools available to users via the user interface. For example, a network tool provider interface 110 may be provided for network visibility and test tool providers to submit new network visibility and test tools and updates to existing network visibility and test tools for availability to users via network tool user interface 106. Examples of network visibility tools include probes, packet brokers, packet filters, security devices, etc. Examples of network test tools include test packet generators/receivers for transmitting packets to a device under test, receiving a response from the device under test, and evaluating performance and/or functionality of the device under test.

In step 504, the method includes receiving user selection of a network tool. For example, a user may select, via network tool user interface 106, one or more network tools for cloud deployment. The tools may be network visibility tools or test tools In step 506, the method includes receiving user selection of a location for deployment of a network tool. For example, network tool user interface 106 may provide a deployment panel, for example, as illustrated in FIG. 2C for the user to select one or more cloud or on-premises locations where a network tool will be deployed.

In step 508, the method includes deploying the network tool in the selected location. For example, network tool deployment and maintenance manager 112 may interface with a service orchestration system in one or more cloud or on-premises networks to deploy network tools in locations selected by the user. Interfacing with the service orchestration system may include requesting allocation of virtual and physical resources in a target cloud to host the network tools. For example, one cloud service provider requires creation of a node for hosting virtual applications. Returning to FIG. 1, to initiate the deployment process, network tool deployment and maintenance manager 112 may send a request to one of service orchestration systems 114 for creation of a new node in its respective cloud or zone 116. In the example in FIG. 1, the new node is a virtual partition of cloud resources for hosting applications, such as network visibility or test components or applications. In response to the request, the service provider orchestration system 114 creates a new node in its respective cloud or availability zone 116. Because cloud service providers may start metering resources where nodes are created, it is desirable that new nodes be allocated on the fly, as new network tools are needed.

After the creation of the new node in cloud 116, network tool deployment and maintenance manager 112 communicates the identity of the new node to an orchestration master (not shown in FIG. 1) within the target cloud 116. Cloud service provider orchestration system 114 communicates the availability and identity of the new node to the orchestration master. In one exemplary implementation, the orchestration master may be a Kubernetes master. Kubernetes is an open source system for deployment of applications in a computer network. Kubernetes is provided as an example. However, the subject matter described herein is not limited to using Kubernetes to deploy network tools. Any system that enables deployment of network tools in desired locations, such as in specific availability zones, is intended to be within the scope of the subject matter described herein.

In step 510, the method includes providing interface for the user to manage operation and maintenance of deployed network tools. For example, network tool user interface 106 may provide a panel, such as that illustrated in FIGS. 2D and 2E for the user to manage operation and maintenance of deployed network tools. The user interface elements for managing the operation and maintenance of deployed network tools may allow the user to monitor the performance of deployed network tools, including visibility and test tools available from different tool providers. The user interface elements for managing the operation and maintenance of deployed network tools may also allow the user to start, stop, add, delete, and update network tools from different network tool providers.

Figure 4A:
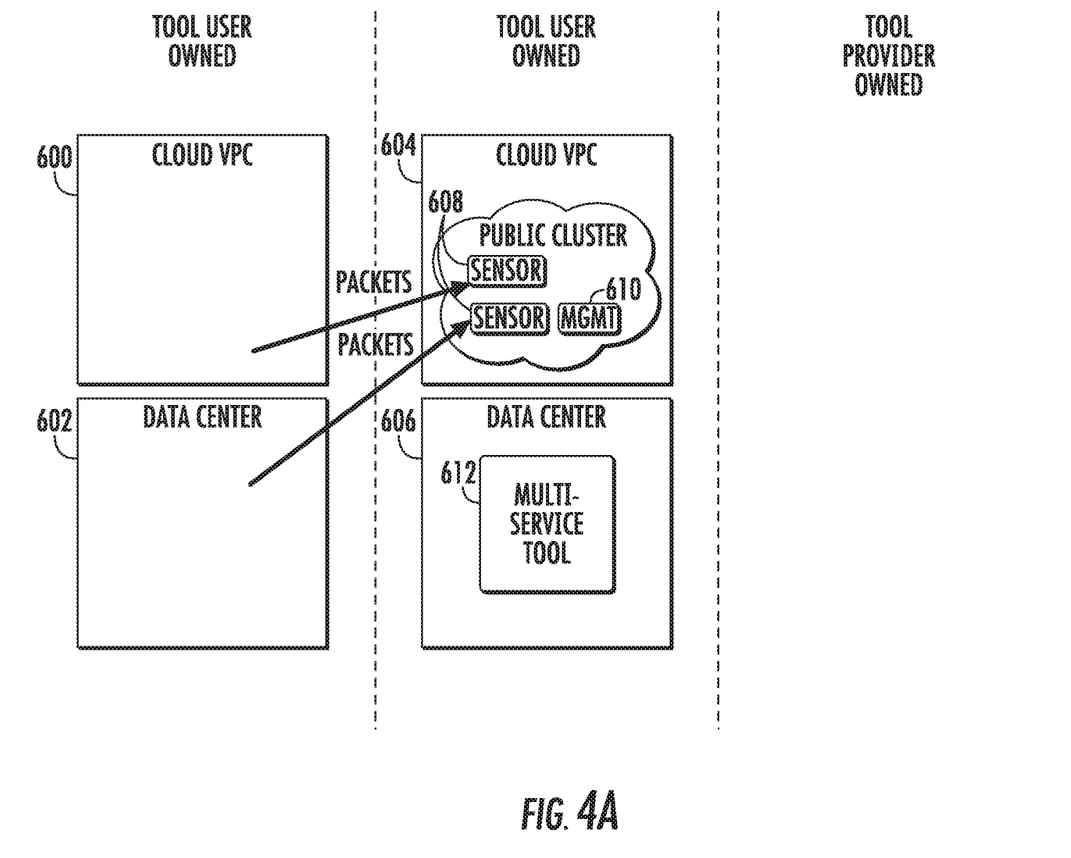
FIG. 4A is a network diagram illustrating an initial cloud based deployment of network tools.
Figure 4B:
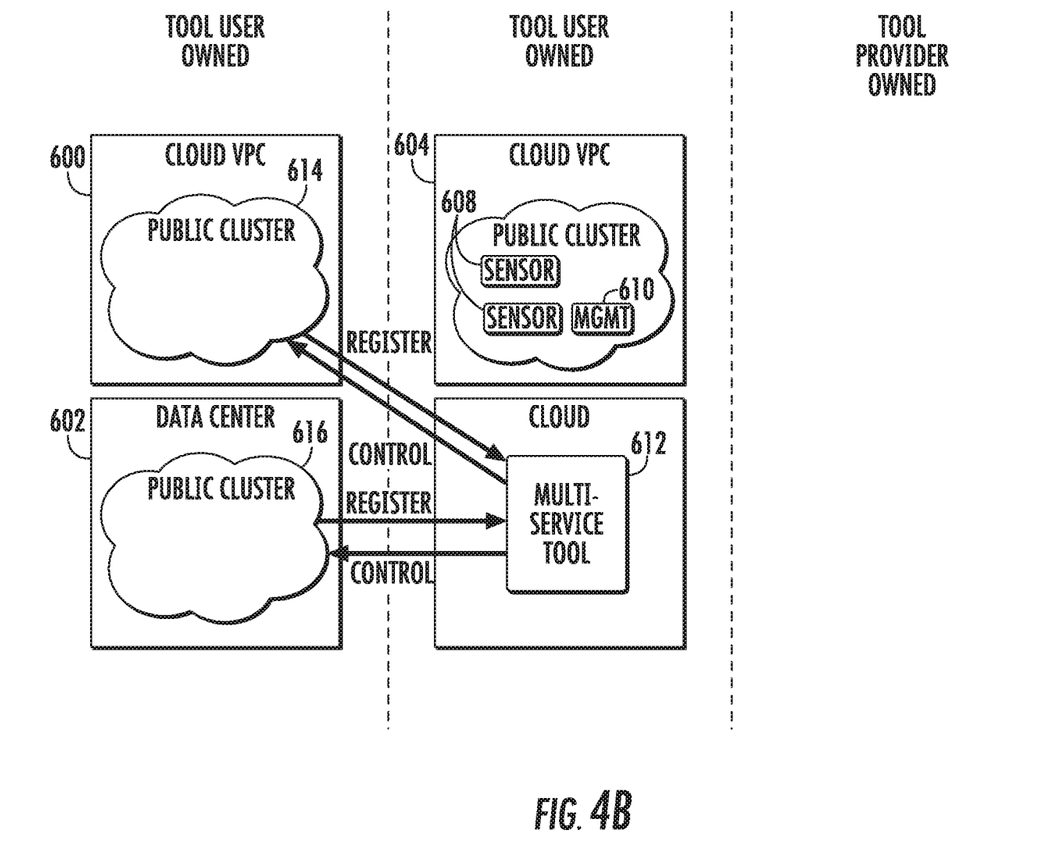
FIG. 4B is a network diagram illustrating registration for cloud-based management of on-premises deployed network tools.

FIGS. 4A-4D illustrate examples of deployment of network tools using the architecture described herein. Referring to FIG. 4A, an initial deployment of network tools where the tools are deployed solely in the tool manager's network domain is disclosed. In FIG. 4A, each column represents a network domain. The left-most column in FIG. 4A illustrates a tool user domain owned and managed by a network tool user. The tool user domain includes a virtual private cloud 600 and a data center 602, each owned and managed by the network tool user. The central column represents a tool manager domain. The tool manager domain includes a virtual private cloud 604 and a management cloud 606 owned and managed by the network tool manager. The right-most column represents a tool provider domain where components owned and managed by the network tool provider reside. In the example in FIG. 4A, the right-most column is empty.

In the deployment scenario in FIG. 4A, sensors 608 represent deployed network visibility tools. Packets from tool user networks 600 and 602 are provided to sensors 608.

Sensors 608 analyze the data and output summary statistics to a service management component 610. Service management component 610 performs management for sensors 608 and may provide output to a user. Multi-service tool management component 612 is deployed in cloud 606, which is also in the tool manager domain. Multi-service tool management component 612 performs the functionality described herein for network tool deployment, management, and maintenance.

In FIG. 4A, sensors 608 are deployed in the tool user domain, which may result in excessive amounts of packet traffic being forwarded from the sensors to the service management component in the tool manager domain. To reduce the packet traffic, in FIG. 4B, preparation is being made for on-premises deployment of sensors 608. Accordingly, processing clusters 614 and 616 register with multi-service tool management component 612. In response to the registration, multi-service tool management component 612 deploys sensors in clusters 614 and 616 of the tool user domain. Such a deployment is illustrated in FIG. 4C.

Figure 4C:
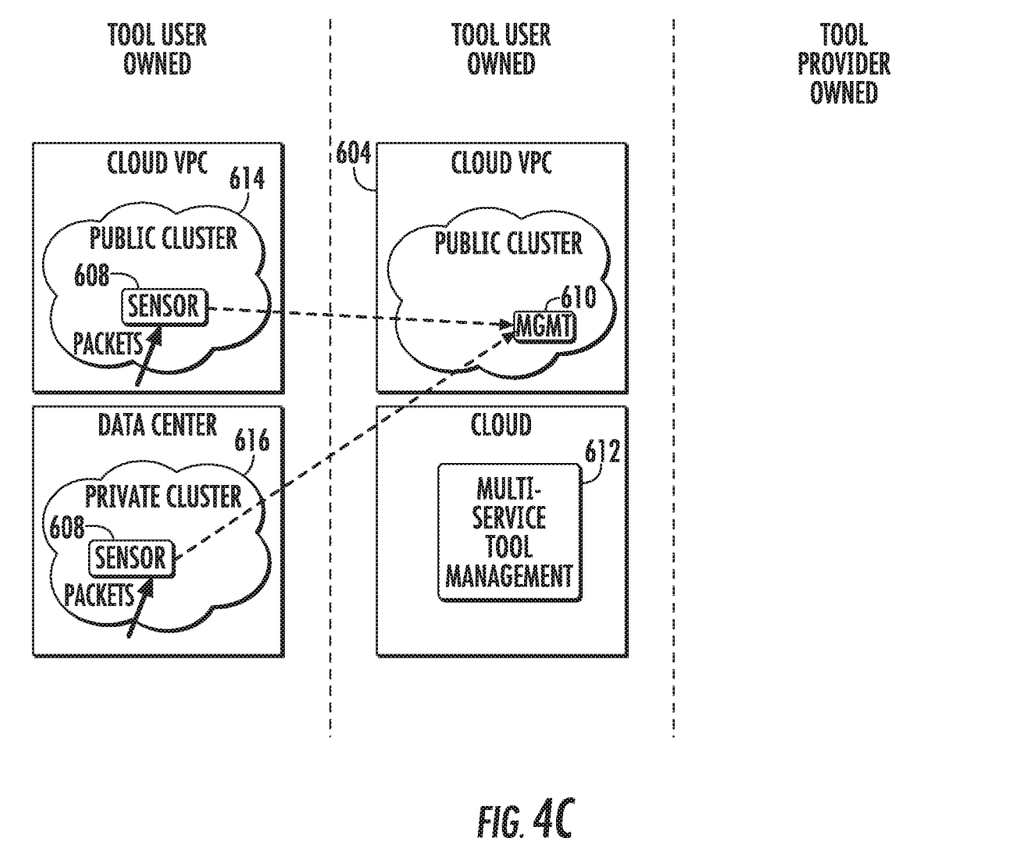
FIG. 4C is a network diagram illustrating on-premises deployment and cloud management of network tools.
Figure 4D:
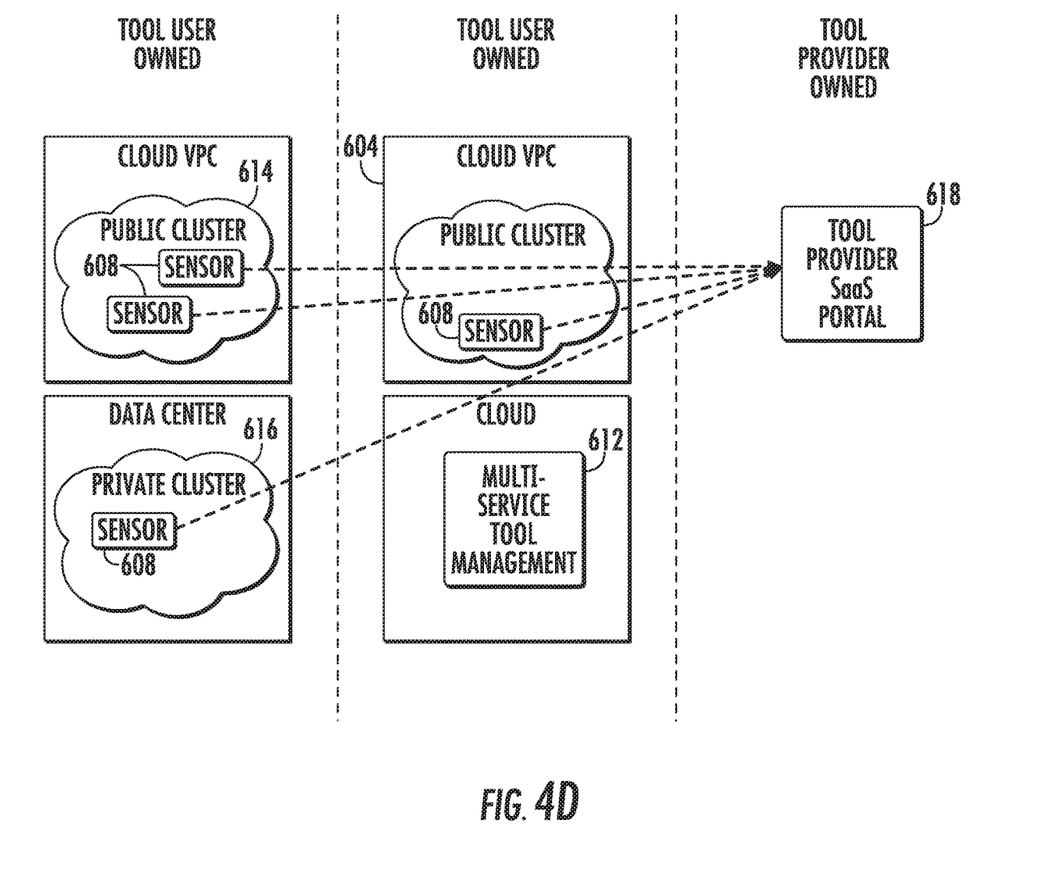
FIG. 4D is a network diagram illustrating cloud management of network tools deployed in a tool user's network where the tools provide data to a service management function in a tool provider's network.

Referring to FIG. 4C, sensors 608 are deployed in clusters 614 and 616 of the tool user domain. As such, packets are collected locally in the tool user's network by sensors 608. The volume of traffic between sensors 608 and management component 610, which is deployed in the tool manager owned VPC 604, occurs within the tool user domain instead of crossing domains. Keeping packet traffic within the tool user domain may reduce cloud metering charges and latency over the implementation illustrated in FIG. 4A FIG. 4D illustrates yet another example deployment of network tools. In FIG. 4D, sensors 608 are deployed in the tool user domain. However, the service management component for sensors 608 resides in the tool provider domain. The management component is illustrated in FIG. 4D as software as a service (SaaS) portal 618. In such an example, multi-service tool management component 612 may be used to deploy sensors 608 and configure sensors 608 to communicate summaries of monitored packets to tool provider SaaS portal 618.

It will be understood that various details of the presently disclosed subject matter may be changed without departing from the scope of the presently disclosed subject matter. Furthermore, the foregoing description is for the purpose of illustration only, and not for the purpose of limitation.

What is claimed is:

1. A method for managing deployment and maintenance of network tools, the method comprising:
providing a network tool user interface for displaying network tools available for deployment from a plurality of different network tool providers and for receiving user selection of one or more of the network tools for deployment;
providing a network tool provider interface for network tool providers to submit network tools to be made available to users via the network tool user interface, wherein the network tools include network test tools and network packet brokers;
receiving, from a user and via the network tool user interface, selection of one or more of the network tools for deployment, wherein the selected network tool comprises a network packet broker;
receiving, via the network tool user interface, a location for deploying the selected network tool;
interfacing with a service orchestration system of the location for deploying the selected network tool in the location; and providing at least one user interface element for managing operation of the network tool.

2. The method of claim 1 wherein providing a network tool user interface includes providing a marketplace screen with icons corresponding to the network tools available from the different providers.

3. The method of claim 2 wherein the icons each include a deploy button which allow the user to initiate deployment of a network tool.

4. The method of claim 1 wherein providing a network tool user interface includes providing a service detail screen for displaying details of a service provided by the network tool.

5. The method of claim 1 wherein providing a network tool user interface includes providing a deployment panel for user-managed deployment of the network tool.

6. The method of claim 5 wherein the deployment panel provides for user selection of cloud deployment or on-premises locations for the network tool.

7. The method of claim 1 wherein providing a network tool user interface includes providing a service monitoring screen displaying icons corresponding to deployed network tools with operating statistics of each tool and a user interface element for starting and stopping each tool.

8. The method of claim 1 wherein providing a network tool user interface includes providing a service maintenance screen that displays an overall traffic statistic for a network visibility or test service, individual traffic statistics for a plurality of deployed network visibility or test tools that provide the service, and allows the user to add and remove individual visibility or test tools or the service as a whole.

9. The method of claim 8 wherein the service maintenance screen allows the user to add or remove network visibility or test tools available from different network visibility or test tool providers.

10. The method of claim 1 wherein providing a network tool user interface includes providing an application programming interface or an event triggered interface through which a user can define conditions for automated deployment and maintenance of the network tools.

11. A system for managing deployment and maintenance of network tools, the system comprising:
   at least one processor;
   a network tool user interface implemented by the at least one processor for displaying network tools available for deployment from a plurality of different network tool providers and for receiving user selection of one or more of the network tools for cloud deployment, wherein the network tools include at network test tools and network packet brokers;
   a network tool provider interface implemented by the at least one processor for network tool providers to submit network tools to be made available to users via the network tool user interface;
   wherein the network tool user interface is configured to receive, from a user, selection of one or more of the network tools for deployment and a location for deploying the selected network tool, wherein the selected network tool comprises a network packet broker;
   a network tool deployment and maintenance manager for interfacing with a service orchestration system of the location for deploying the selected network tool in the location; and wherein the network tool user interface provides at least one user interface element for managing operation of the network tool.

12. The system of claim 11 wherein the network tool user interface includes a marketplace screen with icons corresponding to the network tools available from the different providers.

13. The system of claim 12 wherein the icons each include a deploy button which allow the user to initiate deployment of a network tool.

14. The system of claim 11 wherein the network tool user interface includes a service detail screen for displaying details of a service provided by the network tool.

15. The system of claim 11 wherein the network tool user interface includes a deployment panel for user-managed deployment of the network tool.

16. The system of claim 15 wherein the deployment panel provides for user selection of cloud or on-premises deployment locations for the network tool.

17. The system of claim 11 wherein the network tool user interface includes a service monitoring screen displaying icons corresponding to deployed network tools with operating statistics of each tool and a user interface element for starting and stopping each network tool.

18. The system of claim 11 wherein the network tool user interface includes a service maintenance screen that displays an overall traffic statistic for a network visibility or test service, individual traffic statistics for a plurality of deployed network visibility or test tools that provide the service, and allows the user to add and remove individual network visibility or test tools or the service as a whole.

19. The system of claim 11 wherein the network tool user interface includes an application programming interface or an event triggered interface through which a user can define conditions for automated deployment and maintenance of the network tools.

20. A non-transitory computer readable medium having stored thereon executable instructions that when executed by a processor of a computer control the computer to perform steps comprising:
   providing a network tool user interface for displaying network tools available for deployment from a plurality of different network tool providers and for receiving user selection of one or more of the network tools for deployment, wherein the network tools include network test tools and network packet brokers;
   providing a network tool provider interface for network tool providers to submit network tools to be made available to users via the network tool user interface;
   receiving, from a user and via the network tool user interface, selection of one or more of the network tools for deployment, wherein the selected network tool comprises a network packet broker;
   receiving, via the network tool user interface, a location for deploying the selected network tool;
   interfacing with a service orchestration system of the location for deploying the selected network tool in the location; and
   providing at least one user interface element for managing operation of the network tool.

* * * * *

UNITED STATES PATENT AND TRADEMARK OFFICE
CERTIFICATE OF CORRECTION

PATENT NO. : 11,038,770 B2
APPLICATION NO. : 16/219888
DATED : June 15, 2021
INVENTOR(S) : Raney Page 1 of 1

It is certified that error appears in the above-identified patent and that said Letters Patent is hereby corrected as shown below:

In the Claims

In Column 9, Line 49, in Claim 11, after "include" delete "at".

Signed and Sealed this
Thirty-first Day of August, 2021

Drew Hirshfeld
*Performing the Functions and Duties of the
Under Secretary of Commerce for Intellectual Property and
Director of the United States Patent and Trademark Office*